United States Patent Office 3,026,241
Patented Mar. 20, 1962

3,026,241
CELLULOSIC PRODUCT AND METHOD
OF MANUFACTURE
John F. Hechtman and Edwin G. Greenman, Munising, Mich., assignors to Kimberly-Clark Corp., Neenah, Wis., a corporation of Delaware
No Drawing. Filed July 30, 1957, Ser. No. 675,017
6 Claims. (Cl. 162—135)

This invention relates, as indicated, to saturated fiber products, and more particularly to cellulose fibers impregnated with compositions containing linear soft elastic polymers having carboxylic functional groups and salts thereof, and processes for their preparation.

The desirable physical characteristics of a saturated fiber sheet for some uses may be summarized by a single property known as "toughness." Although toughness is a complex characteristic, it may be generally defined by the stress-strain properties of a sheet. Toughness attains its highest level by a correct combination of tensile strength and stretch. Among the other desirable characteristics of a saturated sheet are high wet strength properties, high folding endurance, high flexibility, high internal tear, high edge tear, delamination resistance, and resistance to physical degradation and discoloration due to heat and light aging.

Until relatively recently, unsaturated rubber latices, and solutions thereof, were the principal commercial saturants used for paper impregnation. These rubber latices possess the physical properties in some degree necessary for saturation, but also have certain disadvantages. One of the disadvantages is poor heat and light stability due to the chemical unsaturation of the molecule. Another disadvantage is a strong odor. Also, even though rubber itself may possess desirable tensile and stretch properties, its adhesion to cellulose may be poor, so that the desirable properties of the latex film are not fully imparted to the finished sheet.

High adhesion of a saturant resin to the fiber is an important requirement in order to obtain adequate tensile strength, and to maintain continuity of strain under stress. Adhesion may be obtained by chemical reaction, physical attraction, or mechanical entanglement. Mechanical entanglement alone is inadequate to produce sufficient adhesion, and must be supplemented by the other two forces. While the forces of physical attraction may be adequate when the sheet is dry, they may be destroyed when it is wet. Adhesion by chemical reaction between the saturant and the cellulose, which is not affected by water, or other liquids, is highly desirable. In addition to adhesion to the fibers, the saturant polymer should possess stress-strain characteristics consistent with the properties desired in the finished sheet, as previously enumerated. Where water, or liquid, wet-strength properties are of importance, the saturant should be relatively unaffected by the liquid. Furthermore, the saturant should have good resistance to heat and light aging. Also, the saturant should desirably be colorless. Another important practical characteristic is that the saturant should be non-toxic, and should not require compounding with potentially toxic materials.

However, even if a saturant is selected with chemical affinity for the cellulose fibers, which includes all of the above enumerated desirable properties, impregnation on a conventional paper web having medium, or greater, bonding between fibers will not meet all expectations in the saturated sheet. Although there is a specific chemical adhesion between the saturant and the fibers, the finished product will possess a higher tensile, lower stretch, lower toughness, and higher stiffness than would be anticipated from the examination of the properties of the latex itself. Thus, chemical adhesion of the saturant polymer to the fibers is not enough, in itself, to impart all the properties of the saturant film to the finished sheet.

In general, previous workers in this field have been primarily concerned with the properties of the saturant for the saturated sheets. The unsaturated fiber sheets, in all instances, have not been regarded with the degree of concern accorded the saturant.

It is an object of the present invention to provide saturated sheets which have a high degree of toughness. It is a further object of the invention to provide a sheet of saturated fibers with a high degree of stretch and of a desirable dry and wet tensile strength. It is another object of the invention to provide an impregnated cellulose sheet having a high degree of flexibility. It is still another object of the invention to provide a sheet with good fold endurance. It is yet another object of the invention to provide a saturated sheet with a high delamination resistance. It is still another object of the invention to provide a saturated sheet with high internal and edge tear. It is still yet another object of the invention to provide a saturated sheet with resistance to physical degradation and discoloration due to heat and light aging. Further objects of the invention will be apparent from examination of the ensuing description and appended claims.

Pursuant to the present invention, it has been discovered that the change in the physical characteristics due to saturation of a sheet may produce two different types of product. One type amplifies the inherent physical properties peculiar to that obtained by a particular fiber, and adhesion of that fiber to itself. For example, a conventional sheet of paper is characterized as having high tensile strength, low stretch and, consequently, a high modulus and high stiffness. These properties are a reflection of the properties of cellulose and cellulose to cellulose bonds themselves. If it is wished to amplify these properties, the first thing to be done is to increase the bonded area in the sheet by the techniques of refining and wet pressing. This results in noticeable increases in tensile strength, stiffness, and delamination resistance along with other changes commonly associated with the application of these techniques. In the event the amplitude of the changes was not as great as desired, resort might be made to saturation to further increase and reinforce the bonded areas. A saturant is employed in such a case having adequate fiber adhesion and a modulus or stress-strain characteristic similar to cellulose, such as polyvinyl alcohol, polyvinyl acetate, starches, gums, and the like.

As to the second type of saturated sheet, it possesses completely different physical properties than those listed above, having the following characteristic physical properties: low to moderate tensile, high stretch, and consequently a low modulus and high work function (integrated area under the stress-strain curve), low stiffness, high delamination resistance, high tear, and high fold endurance. To obtain these characteristics direct fiber to fiber bonding should be at a minimum, the saturant should have good adhesion to the fiber, the saturant should interpose itself between the fibers forming a fiber to saturant to fiber bond, and the stress-strain characteristics of the saturant polymer should be those having a tensile strength below that of the fiber and a stretch several magnitudes greater than the fiber and/or a fiber to fiber bonded web.

Broadly stated, the present invention is directed to a saturated fiber product having the properties of the latter type resembling to a greater degree the saturant than the fiber sheet, comprising a web of loosely bonded fibers impregnated with a composition containing a copolymer having carboxylic acid groups, or salts thereof.

More particularly, the present invention is concerned with a saturated sheet characterized by low to moderate tensile, high stretch, and low stiffness, comprising a web of loosely bonded cellulose fibers saturated with a composition containing an acrylic copolymer having carboxylic acid groups and salts thereof, said web having prior to saturation a tensile sum per pound within the range of about 0.04 to about 0.24, an apparent density of from about 1.0 to about 2.6, a time of climb of from about 4 to about 35 seconds and a Frasier porosity of 150 to 8 for a 25 pound sheet, said copolymer formed of a carboxylic acid, and at least one alkyl acrylate.

LOW BONDED BASE SHEET

The low bonded sheet used in the impregnated fiber product of the invention, prior to saturation, may be characterized by low tensile strength, low apparent density, low resistance to air passage, high porosity, and a low time of climb. All of these properties are partially interdependent. As a useful and convenient primary property describing the low fiber bonding, tensile strength may be used as an index. A tensile sum per pound, as hereinafter defined, within the range from about 0.04 to about 0.24 indicates the range of a low bonded sheet within the scope of the invention. The apparent density is also a good index of low fiber bonding and in the low bonded sheets is within the range from about 1.0 to about 2.6. In low bonded sheets the time of climb is from about 4 to about 35 seconds, and the Frasier porosity from about 150 to about 8 for a 25 pound sheet.

A low degree of fiber bonding may be obtained by the process of sheet manufacture, and selection of the kind of fiber used. The manufacturing process involves forming a sheet of relatively unrefined fibers from an aqueous suspension, and subjecting the sheet to a minimum of wet pressing before drying. For example, the fibers may be refined by means of a Jordan engine to the desired degree consistent with the formation and degree of fiber bonding desired, and then formed on a Fourdrinier paper machine. The wet sheet may be subjected to no pressing, or may be pressed with one, or two, presses before drying. The amount of pressing is determined by the inherent tendency of the particular fibers used to bond to each other, and the degree of fiber bonding desired in the final sheet. After drying, the sheet may or may not be calendered depending on the end use of the finished product. The data in Table I indicates the effect of some of these variables. Any fiber having a bonding surface which is activated by an aqueous medium will have a lesser degree of fiber to fiber bonding when formed into a sheet if the fiber refining is at a minimum and wet pressing of the sheet is at a minimum. Special preference is given to cellulose fibers and desirably long fiber wood pulps. Investigation of specialty wood pulps has shown that alpha treated pulps (pulps treated with caustic) exhibit lower degrees of fiber to fiber bonding than untreated pulps. Long fiber kraft pulps, both bleached and unbleached, treated with a higher concentration of caustic than normally employed in the alpha treatment process exhibit very low degrees of fiber to fiber bonding and are well suited to the production of low bonded papers. Alpha treated pulps produced by the kraft process generally exhibit a lesser degree of bonding than alpha treated sulfite pulps. Satisfactory low bonded sheets may be obtained with a high caustic concentration treated unbleached kraft spruce pulp sold as "Solka 10A" and an alpha treated bleached kraft spruce pulp sold as "Solka 30," both of which are produced by Canadian International, and sold by Riordan Pulp Sales.

For the production and subsequent processing of low fiber to fiber bonded sheets it has been found that certain sheet additives act as processing aids without materially detracting from the features of the low bonded sheet. Wet strength agents such as melamine-formaldehyde, dry strength agents such as gums and starches, the combination of wet strength and dry strength agents to produce both wet and dry strength as well as a very modest degree of sizing may be used as processing aids.

Table I below presents the major physical properties of a variety of saturating papers exhibiting various degrees of low fiber bonding within the range contemplated by the invention:

*Table I.—Physical Properties and Fiber Identification of Unsaturated Low Bonded Base Papers*

| | | | | | |
|---|---|---|---|---|---|
| Basis Weight | 23.8 | 23.9 | 33.6 | 38.5 | 25.6 |
| Caliper | 21.6 | 21.8 | 21.0 | 16.3 | 9.97 |
| Apparent Density | 1.10 | 1.09 | 1.60 | 2.36 | 2.57 |
| Tensile Sum/Lb | 0.078 | 0.066 | 0.08 | 0.120 | 0.164 |
| Tensile Ratio | 1.91 | 1.75 | 2.1 | 1.80 | 2.26 |
| Porosity: | | | | | |
|   Gurley | 0.25 | .16 | 0.8 | 2.1 | 3.5 |
|   Frazier | 97 | 114 | 36 | 12.0 | |
| Pulp-Trade Name | "SP-206" [1] | "Solka" Special [2] | "Solka 10A" [3] | "Solka 10A" [3] | "Solka 30" [4] |
| Number of Presses Used in Mfg. | None | None | None | 2 | 2 |
| Relative Degree of Refining | Slight | Slight | Slight | Hard | Med |

[1] "SP-206"—Mild alkaline cooked and hypochlorite bleached cotton linters.
[2] "Solka" Special—Kraft pulped spruce fiber. Unbleached. Given very strong caustic extraction.
[3] "Solka 10A"—Kraft pulped spruce fiber. Unbleached. Given strong caustic extraction.
[4] "Solka 30"—Kraft pulped spruce fiber. Convention alpha treatment. Bleached.

The units, used in the above table, and elsewhere in the specification and claims, are defined as follows:

*Basis weight.*—Weight in pounds of a ream of paper 17 inches x 22 inches per 500 sheets, weighed at 50 percent relative humidity and 72° F. Essentially the same as TAPPI Method T410m–45. All subsequent tests are made on like conditioned paper.

*Caliper.*—Thickness of a single sheet of paper expressed in mils or thousandths of an inch, as by TAPPI Method T411m–44.

*Apparent density.*—Apparent density is determined by dividing the basis weight by the caliper to yield the ream weight in pounds per mil of thickness.

*Dry tensile strength—machine and cross direction.*—The breaking strength as determined on a pendulum type tester having a bottom jaw travel of 12 inches per minute. The test is performed on a strip 15 mm. wide, and the tensile strength is reported in kg./15 mm. strip width. TAPPI Method T404m–50.

*Tensile sum per pounds of basis weight.*—This index is obtained by dividing the sum of the machine and cross direction tensiles in kg./15 mm. by the basis weight.

*Tensile ratio.*—A dimensionless number which is obtained by dividing the machine direction tensile by the cross machine tensile and is primarily used as a restriction in comparing tensile sums of paper having large differences in tensile ratios. Most Fourdrinier saturating papers in the weight range of 10 lbs. up have ratios of 1.4 to 3.5. Cylinder machine grades may have ratios of as high as 10.

*Porosity.*—Gurley porosity is of only limited value in evaluating low bonded papers since the porosity is below the useful range of the instrument. On low bonded papers Gurley porosities have been found of 0.3 second per 100 cc. for eight sheets having a basis weight of 35 lbs. A Frazier porosity tester has been found better suited for determining the porosity of low bonded papers. The units of Frazier porosity are cubic feet of air flow through the material per minute per square foot under a differential head of 0.5 inch of water.

The following Table II presents a beater analysis of various pulps illustrating suitable and unsuitable fibers for the preparation of low bonded cellulose sheets. Fibers characterized by low apparent density, low tensile sum per pound, low time of climb, and low Gurley porosity will produce base sheets of the desired low fiber to fiber bonding.

Examples of such hardening comonomers, include the alkyl methacrylates in which the alkyl group may have from one to four carbon atoms, for example the methyl, ethyl, propyl, iso-propyl, butyl, and iso-butyl methacrylates.

The proportions of the monomers used to produce the copolymer, for example, may be from about 0.5 to about 7% by weight of a carboxylic acid compound, at least 80% by weight of an alkyl acrylate, and from 0% to 19.5% of an alkyl methacrylate.

*Table II.—Laboratory Beater Evaluation of Various Pulps and Identification of Pulps Not Covered in Table I*

| Pulp | Beating Time, Min. | Basis Weight | Appar. Dens. | Tensile Sum/# | Porosity | | Tear | Time of Climb |
|---|---|---|---|---|---|---|---|---|
| | | | | | Gurley | Frazier | | |
| Solka 10A Special | 0 | 16.3 | 1.47 | | | 144 | | |
| | 5 | 14.3 | 1.59 | | | 154 | | |
| | 10 | 16.9 | 1.67 | | | 107 | | |
| | 15 | 17.1 | 1.76 | | | 84 | | |
| Solka 10A | 0 | 20.1 | 2.25 | .0201 | 1.0 | 55 | 13 | 8.2 |
| | 5 | 15.3 | 2.30 | .0693 | 0.8 | 55 | 23 | 9.7 |
| | 10 | 16.4 | 2.25 | .1101 | 1.1 | 37 | 44 | 10.5 |
| | 15 | 15.1 | 2.35 | .1765 | 1.2 | 36 | 58 | 13.9 |
| Solka 30 | 0 | 16.1 | 2.46 | .0454 | 1.4 | | 31 | 11.4 |
| | 5 | 17.1 | 2.64 | .1255 | 2.2 | | 54 | 15.6 |
| | 10 | 15.8 | 2.73 | .215 | 2.6 | | 77 | 19.8 |
| | 20 | 16.4 | 3.12 | .280 | 6.8 | | 102 | 40.1 |
| Alpha PPQ | 0 | 15.1 | 2.48 | .0364 | 1.8 | | 20 | 14.8 |
| | 5 | 16.3 | 2.75 | .101 | 3.3 | | 39 | 24 |
| | 10 | 15.6 | 2.98 | .23 | 5.6 | | 57 | 35.7 |
| | 20 | 16.3 | 3.31 | .356 | 23.6 | | 45 | 118.0 |
| Stora 32 | 0 | 19.3 | 2.64 | .0995 | 2.4 | | 58 | 14.8 |
| | 5 | 17.3 | 2.85 | .230 | 3.1 | | 102 | 24.0 |
| | 10 | 17.3 | 3.05 | .381 | 5.0 | | 151 | 35.1 |
| | 20 | 17.4 | 3.31 | .586 | 12.8 | | 112 | 87.2 |
| Cellate | 0 | 17.3 | 2.97 | .146 | 4.6 | | 70 | 23.0 |
| | 5 | 17.6 | 3.14 | .222 | 6.9 | | 118 | 41.9 |
| | 10 | 17.8 | 3.57 | .536 | 11.8 | | 100 | 74.0 |
| | 20 | 17.1 | 3.86 | .812 | 34.9 | | 79 | 205.6 |
| Bleached Sulfite | 0 | 15.9 | 2.96 | .239 | 6.9 | | 48 | 81.2 |
| | 5 | 16.6 | 3.55 | .470 | 22.7 | | 46 | 144 |
| | 10 | 17.1 | 4.04 | .632 | 56.0 | | 40 | 348 |
| | 20 | 17.3 | 4.52 | .711 | 217.0 | | 40 | 1 Hr. |

Solka 10A Special—Essentially the same as Solka Special in Table I.
Bleached Sulfite—Conventional sulfite pulped spruce, balsam, and poplar wood mixture. Hypochlorite bleached.
Alpha PPQ—Sulfite pulped spruce fiber. Conventional alpha treatment. Bleached.
Stora 32—Kraft pulped Norwegian Pine. Bleached.
Cellate—Kraft pulped Spruce fiber. Bleached.

The units used in the above Table II, and elsewhere in the specification, have been previously defined in connection with Table I, except:

*Time of Climb.*—Time in seconds for distilled water to climb 1.0 inch above the water level when the end of a vertically suspended machine direction strip 1.0 inch wide is immersed in the distilled water.

*Tear.*—Internal tearing resistance of paper as described by TAPPI Method T414m–49.

As a matter of information, attention should be brought to another method of producing low fiber bonded sheets, although it is expensive and impractical. This method involves the replacement of water from a water wet sheet, initially with a water miscible organic liquid, and finally with a non polar organic liquid before drying.

SATURANT CONTAINING CARBOXYLIC ACID GROUPS OR SALTS THEREOF

The saturant employed for impregnation of the low bonded fiber sheet is a composition containing a coplymer formed from at least one polymerizable $\alpha,\beta$-unsaturated carboxylic acid in which the unsaturation is a double bond, or ethylenic linkage, and at least one alkyl acrylate in which the alkyl group has from one to four carbon atoms. Examples of polymerizable mono-unsaturated $\alpha,\beta$-ethylenic carboxylic acids include: acrylic acid, methacrylic acid, itaconic acid, aconitic acid, maleic acid, fumaric acid, and the like. Examples of alkyl acrylates include the esters of primary alkanols, such as methyl acrylate, ethyl acrylate, propyl acrylate and butyl acrylate; and esters of secondary alkanols, such as iso-propyl acrylate, iso-butyl acrylate. These copolymers are of a softness such that hardening comonomers may be introduced.

The following list gives several typical copolymer systems, in which the percentages are by weight:

Ethyl acrylate 84.5%, methyl methacrylate 10.5%, itaconic acid 5.0%
Ethyl acrylate 85%, methyl methacrylate 10%, acrylic acid 5.0%
Ethyl acrylate 95%, acrylic acid 5%
Ethyl acrylate 95%, methacrylic acid 5%

Techniques for polymerizing the foregoing monomers into the copolymer are further illustrated in Patents Nos. 2,795,564; 2,760,886; 2,790,736; and 2,790,735.

The copolymer dispersions may be made by any of the known emulsion copolymerization procedures, e.g. by first mixing the several monomers in the desired proportions into an aqueous solution of an anionic, or preferably a non-ionic, dispersing or emulsifying agent.

Examples of anionic emulsifying agents that may be used include the higher fatty alcohol sulfates, such as sodium lauryl sulfate, the alkylaryl sulfonates, such as sodium t-octylphenyl sulfonates, the sodium di-octyl sulfosuccinates and so on. Examples of the non-ionic dispersing agents that may be used for preparing the monomeric emulsions before copolymerization or dispersions of the polymer after polymerization include the following: alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such a lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; block copolymers of ethylene oxide and propylene oxide comprising a hydrophobic propylene oxide section combined with one or more hydrophilic ethylene oxide sections.

For copolymerization, peroxidic free-radical catalysts, particularly catalytic systems of the redox type, are recommended. Such systems, as is well known, are combinations of oxidizing agents and reducing agents such as a combination of potassium persulfate and sodium metabisulfite. Other suitable peroxidic agents include the "per-salts" such as the alkali metal and ammonium persulfates and perborates, hydrogen peroxide, organic hydroperoxides such as tert-butyl hydroperoxide and cumene hydroperoxide, and esters such as tert-butyl perbenzoate. Other reducing agents include water-soluble thiosulfates and hydrosulfites. Activators or promoters in the form of the salts (such as the sulfates or chlorides) of metals which are capable of existing in more than one valence state such as cobalt, iron, nickel, and copper may be used in small amounts. The most convenient method of preparing the copolymer dispersions comprises agitating an aqueous suspension of a mixture of copolymerizable monomers and a redox catalytic combination at room temperature without the application of external heat. The amount of catalyst can vary but for purposes of efficiency from 0.01% to 1.0%, based on the weight of the monomers, of the peroxidic agent and the same or lower proportions of the reducing agent are recommended. In this way it is possible to prepare dispersions which contain as little as 1% and as much as 60% or 70% of the resinous copolymer on a weight basis. It is, however more practical (hence preferred) to produce dispersions which contain about 30% to 50% resin-solids.

$T_i$ values of the polymer from 0° C. to −45° C. are preferred. The $T_i$ value is the transition temperature or inflection temperature found by plotting the modulus of rigidity against temperature. A convenient method for determining rigidity and transition temperature is described by I. Williamson, "British Plastics" 23, 87–90, 102 (September 1950). The $T_i$ value here used is that determined at 300 kg. per square centimeter.

It has been found necessary to adjust the pH of the aqueous dispersion of saturant for the purpose of obtaining good penetration and controlling the viscosity of the saturant. Volatile acids and alkalis such as hydrochloric acid, acetic acid, ammonia, and morpholine may be used. Non-volatile acids and fixed alkalis may also be used. pH values for the saturant of 4.5 to 10 may be used; however, the preferred range is from about 5.8 to about 7.2.

Salts of heavy metals such as calcium, zinc, barium, and magnesium oxides may be used to improve the solvent resistance, improve the heat and light stability, improve dry tensile strength, and increase the rate of wet strength development on heat aging. Dispersions of zinc oxide have been found particularly suitable in the range of 0.05 to 4.0 parts per 100 parts of copolymer on a dry solids basis.

Conventional rubber antioxidants have been found to enhance the heat and light stability of the sheets impregnated with the copolymer where extreme resistance to these conditions is required.

Sensitizing agents to prevent migration of the wet saturant during drying may be employed. Among the conventional sensitizing agents, sodium silico fluoride may be used. Migration may also be controlled by agents which reach a very high viscosity during the drying process.

Clay has been employed as a loading or extending agent. Calcium carbonate, blanc fixe, talc and the like, may also be used. They may be used to the extent of 0 to 100 parts per 100 parts by weight of copolymer on a dry solids basis.

Titanium dioxide may be employed for increasing opacity and improving whiteness. It may be used in the range of 0 to 60 parts per 100 parts by weight of the dry copolymer.

Many of the conventional colored pigments have been used. Metal powders and dyes may also be incorporated to impart color.

The incorporation of 1 to 10 parts of water soluble phenol formaldehyde resin per 100 parts by weight of copolymer may be employed in order to increase the rate and level of water wet strength development and to improve solvent resistance. Urea and melamine formaldehyde resins are also suitable.

In order to give greater flexibility to the saturated sheet, fiber or cellulose plasticizer may be compounded into the saturant. Glycerine, polyethylene glycol, and sorbitol may be employed over the range of 0 to 60 parts per 100 parts by weight of polymer.

SATURATION TECHNIQUES

Saturation of a dry sheet may be accomplished in the following manner. Roll stock of unsaturated base paper is fed into the saturating head. The saturating head may be a float tank prior to the squeeze rolls in which the paper is floated on the surface of the saturant and becomes impregnated by capillary forces carrying the saturant into the sheet. Another type of saturating head is a shower pipe at the squeeze roll. The sheet is passed into the squeeze roll nip at a downward angle and the saturant is supplied by means of a shower pipe to the trough formed by the paper and top squeeze roll. Excess saturant is removed by squeeze rolls, saturant vehicle is evaporated by passing the sheet over heated can dryers, and the dried sheet is wound up in a roll. As alternate drying methods, a festoon or tunnel dryers may be used.

The ratio of dry saturant polymer to fiber for a given base sheet is controlled primarily by the dry solids of the saturant. A secondary but minor control is effected by the nip pressure on the squeeze rolls.

Saturant solids of about 0.1 to about 65 percent may be employed depending upon the polymer to fiber ratio desired in the saturated product, although the usual range is from about 20 to 50 percent. A majority of products are made within the range from about 35 to about 160 parts of dry saturant per 100 parts by weight of fiber, although it is possible to produce useful products in the range of 10 to 200 parts dry saturant per 100 parts by weight of fiber.

In general, pickups in the range of 35 to 75 parts appear to be optimum, both from the standpoint of economics and physical property performance. On the other hand, pickups are set at the level required for the sheet to perform properly in its end use. For example, when high delamination, abrasion, and scuff resistance are required, the pickup level may be set at 75 to 160 parts per 100 parts by weight of fibers.

A heat treatment step of the dried sheet following impregnation causes important changes in saturated sheet properties. Table III below illustrates these changes and their magnitude. Wet tensile shows the most dramatic change.

Heat treatment may be performed by winding the dry saturated sheet up in the roll at a predetermined temperature after which the roll is stored at a like temperature for a predetermined length of time. The curing reaction during heat treatment is stopped by rewinding the roll to reduce the temperature. Heat treatments of 0.5 to 20 hours at temperatures above 100° C. may be employed, although about 1 to about 7 hours at about 105° C. are most generally used. Naturally, practical equivalent time-temperature relationships may be used.

*Table III.—Physical Properties of Unsaturated and Saturated Sheet Physical Properties Using Saturant Containing Carboxylic Acid Groups, and Salts Thereof*

UNSATURATED PAPER PROPERTIES

| | | |
|---|---|---|
| Basis Wt | 24.9 | 25.6. |
| Caliper | 10.48 | 10.2. |
| App. Density | 2.38 | 2.51. |
| Tensile Sum/Lb | 0.085 | 0.133. |
| Ratio | 1.83 | 1.94. |
| Tear: | | |
| M | 56 | 107. |
| C | 47 | 110. |
| Fold: | | |
| M | 2 | 4. |
| C | 0 | 2. |
| Fiber | "Solka 10A" | "Solka 30". |

SATURATED PROPERTIES

| | Before Heat Treated | After Heat Treated [1] | Before Heat Treated | After Heat Treated [1] |
|---|---|---|---|---|
| Basis Wt | 37.9 | 38.2 | 38.0 | 37.5 |
| Caliper | 10.66 | 10.81 | 9.86 | 9.72 |
| App. Dens | 3.56 | 3.53 | 3.85 | 3.86 |
| Dry. Ten.: | | | | |
| M | 8.3 | 9.6 | 9.0 | 9.8 |
| C | 4.5 | 5.8 | 4.9 | 5.7 |
| Dry Str.: | | | | |
| M | 14.0 | 13.9 | 12.9 | 11.1 |
| C | 23.8 | 19.1 | 21.4 | 18.9 |
| Wet Ten.: | | | | |
| M | 1.18 | 5.64 | 1.01 | 5.27 |
| C | 0.56 | 3.37 | 0.50 | 2.93 |
| Wet Stretch: | | | | |
| M | 12.6 | 21.3 | 10.4 | 19.4 |
| C | 16.6 | 29.8 | 17.9 | 29.4 |
| Tear: | | | | |
| M | 240 | 206 | 185 | 161 |
| C | 212 | 202 | 155 | 140 |
| Fold: | | | | |
| M | 4,494 | 4,344 | 5,534 | 5,446 |
| C | 2,604 | 4,550 | 3,145 | 3,038 |
| Modulus Factor: | | | | |
| M | 10.5 | 8.5 | 13.8 | 12.2 |
| C | 4.3 | 4.1 | 5.8 | 5.3 |
| Delam. Resis | 476 | 476 | 440 | 430 |

[1] Six hours, at 105° C.

The units used in the above Table III, and elsewhere in the specification, have been previously defined in connection with Tables I and II, except the following:

*Dry tensile strength.*—Essentially the same as covered in Table I; however, it is necessary to introduce the concept of loading rate. Because of the rheological characteristics of resins and elastomers their tensile strength and stretch properties vary under different rates of stress application. The tensile data reported here were obtained under an average loading rate of 1.8 kilograms per second per 15 millimeter strip width on a strip 100 millimeters in length between the gripping jaws. A pendulum type tensile tester was used which is not well suited for specifying loading rate.

*Dry stretch.*—This data is obtained in conjunction with the tensile strength, and is expressed as the percentage increase in strip length where the increase in strip length is the difference between the original strip length subjected to stress and the final stressed strip length at the time of rupture.

*Wet tensile and stretch.*—These data are obtained in the same manner as the dry properties with exception that the strips are completely wet wtih the liquid in question, and the average loading rate is 0.6 kg./sec.

*MIT fold.*—TAPPI Standard Method T423m-50; II M.I.T. folding endurance.

*Modulus factor.*—This test indicates the stiffness of a sheet and is determined by means of a dynamic torsion pendulum stiffness tester. A description of this instrument and the method are contained in Report No. 26 To: The American Paper and Pulp Association Instrumentation Program. This is a fundamental property of any material, and its units are in dynes per centimeter.

*Delamination resistance.*—This test indicates the resistance to internal splitting of a sheet. The test involves adhering a cloth tape to each side of the sheet, mechanically starting a separation of the cloth tape in such a manner that the saturated sheet is split down the middle, and finally placing the two tape ends leading to the split in the jaws of the tensile tester as a means of determining the force required to sustain the splitting. In our case, strips 15 millimeters wide are tested, and the rate of splitting is at four inches per minute. Results are expressed in grams per 15 mm. strip width.

Subsequent mechanical treatment of the saturated sheet is often used to produce a variety of effects. Calendering and super-calendering have been used to increase the apparent density and soften the saturated sheet as well as to improve the surface for coating. For a number of end uses it is desirable to emboss the saturated sheet with a variety of patterns and pattern depths. Saturated products made from low bonded, as contrasted to medium or high bonded sheets, are outstanding in their resistance to degradation of physical properties by any of the above mechanical treatments. An important change in physical characteristics of the product of this invention brought about by mechanical treatment is an increase in flexibility, without degradation of other desirable properties.

Saturated sheets described herein may be used for abrasive papers, glue coated tape stocks, pressure sensitive tape stocks, protective masking sheets, artificial leather stocks, artificial chamois, pennant and banner stock, labels, book cover stack, automobile trim panel base stock, projection screens, printing press top cover sheets, gaskets, cloth replacements, window shades, and the like.

A distinct advantage of saturated sheets of the invention is the ability to meet the requirement for high temperature end uses. Solvent resistance is also enhanced in the impregnated sheets disclosed herein.

It should be noted that nearly all of the ultimate products require subsequent coating, spreading, or laminating operations on the saturated base sheet. Herein lies a distinctly advantageous feature of the disclosed saturated sheets. The same forces which promote adhesion of the polymers to fibers also promote adhesion of a variety of widely used coating materials. Good adhesion between saturated sheets of the invention and plasticized vinyl chloride, pyroxylin, acrylates, Buna-N, abrasive paper varnishes, animal glues, pressure sensitive masses, and the like is obtained.

The following theory is offered as an explanation for the specific chemical affinity of the polymer for cellulose fibers to further disclose the invention, and it is not intended as a limitation of the scope of the patent. The cellulose molecule is made up of recurring units which contain hydroxyl groups. It is believed that carboxylic functional groups in the saturant polymer condense with the hydroxyl groups of the fiber to form ester linkages between the cellulose and polymer. This is thought to account for some of the properties of the saturated sheet described above.

Other modes of applying the principle of the invention may be employed, change being made as regards the details described, provided the features stated in any of the following claims or the equivalent of such be employed.

We, therefore, particularly point out and distinctly claim as our invention:

1. A saturated paper product of enhanced toughness comprising a sheet of loosely bonded cellulose fibers saturated with from about 35 to 160 parts by weight on a solids weight basis per 100 parts by weight of fibers with a composition containing a copolymer selected from the class consisting of compounds having carboxylic acid groups and salts thereof, said sheet having prior to saturation an apparent density from about 1.0 to about 2.6 and a tensile sum per pound within the range from about 0.04 to about 0.24, said copolymer having a $T_1$ from 0° C. to −45° C. formed from about 0.5% to about 7% by weight of at least one polymerizable α,β-ethylenic carboxylic acid, at least 80% by weight of at least one alkyl acrylate in which the alkyl group has from 1 to 4 carbon atoms, and not more than about 19.5% by weight of at least one alkyl methacrylate in which the alkyl group has from 1 to 4 carbon atoms.

2. A saturated paper product of enhanced toughness comprising a sheet of loosely bonded cellulose fibers having prior to saturation an apparatus density from about 1.0 to about 2.6 and a tensile sum per pound within the range from about 0.04 to about 0.24, said sheet being saturated with a composition containing from about 35 to about 160 parts by weight on a dry weight basis per 100 parts by weight of fibers of a copolymer formed from units having carboxylic acid groups from at least one polymerizable α,β-ethylenic carboxylic acid, and units from at least one polymerizable ester which by itself forms soft polymers selected from the class consisting of esters of acrylic acid and primary alkanols of from 1 to 4 carbon atoms and esters of acrylic acid and secondary alkanols of from 1 to 4 carbon atoms.

3. An impregnated fiber product of enhanced toughness comprising a sheet of loosely bonded fibers saturated with from about 35 to 160 parts by weight on a solids weight basis per 100 parts by weight of fibers with a subsequently cured copolymer selected from the class of compounds having carboxylic acid groups and salts thereof with a chemical affinity for said fibers, said sheet having prior to saturation an apparent density from about 1.0 to 2.6 and a tensile sum per pound within the range from about 0.04 to 0.24, said copolymer having a $T_1$ from 0° C. to −45° C., said impregnated product having a minimum of fiber to fiber bonds and characterized by amplified fiber to saturant to fiber bonds.

4. A saturated paper product of enhanced toughness comprising a sheet of loosely bonded cellulose fibers having prior to saturation an apparent density from about 1.0 to about 2.6 and a tensile sum per pound within the range from about 0.04 to about 0.24 said sheet being saturated with a composition containing from about 35 to about 160 parts by weight on a dry weight basis per 100 parts by weight of fibers of a curable copolymer formed from units having carboxylic acid groups from at least one polymerizable α,β-ethylenic carboxylic acid, and units from at least one polymerizable ester which by itself forms soft polymers selected from the class consisting of esters of acrylic acid and primary alkanols of from 1 to 4 carbon atoms and esters of acrylic acid and secondary alkanols of from 1 to 4 carbon atoms.

5. The process for manufacturing a paper product of improved toughness which comprises the steps of forming a sheet of loosely bonded cellulose fibers having an apparent density from about 1.0 to about 2.6 and a tensile sum per pound within the range from about 0.4 to about 0.24, saturating said sheet with a composition having a pH within the range from about 4.5 to about 10 containing a copolymer formed from about 0.5% to about 7% by weight of at least one polymerizable α,β-ethylenic carboxylic acid, at least 80% by weight of at least one alkyl acrylate in which the alkyl group has from 1 to 4 carbon atoms, and not more than about 19.5% by weight of at least one alkyl methacrylate in which the alkyl group has from 1 to 4 carbon atoms, said cellulose fibers being saturated with from about 35 to 160 parts by weight on a solids weight basis per 100 parts by weight of fibers with said composition, and subjecting said saturated sheet to temperatures above 100° C. for a period of at least 0.5 hour.

6. The process for manufacturing a paper product of improved toughness which comprises the steps of forming a sheet of loosely bonded cellulose fibers having an apparent density from about 1.0 to about 2.6 and a tensile sum per pound within the range from about 0.4 to about 0.24, saturating said sheet with a composition having a pH within the range from about 4.5 to about 10 containing a copolymer formed from about 0.5% to about 7% by weight of at least one polymerizable α,β-ethylenic carboxylic acid, at least 80% by weight of at least one alkyl acrylate in which the alkyl group has from 1 to 4 carbon atoms, and not more than about 19.5% by weight of at least one alkyl methacrylate in which the alkyl group has from 1 to 4 carbon atoms, said cellulose fibers being saturated with from about 35 to 160 parts by weight on a solids weight basis per 100 parts by weight of fibers with said composition, and mechanically compacting said saturated sheet to increase the apparent density.

References Cited in the file of this patent

UNITED STATES PATENTS

| | | |
|---|---|---|
| 2,633,430 | Kellgren | Mar. 31, 1953 |
| 2,681,870 | Novak | June 22, 1954 |
| 2,754,280 | Brown | July 10, 1956 |
| 2,757,106 | Brown et al. | July 31, 1956 |
| 2,759,900 | Caldwell | Aug. 21, 1956 |
| 2,765,229 | McLaughlin | Oct. 2, 1956 |
| 2,790,735 | McLaughlin et al. | Apr. 30, 1957 |
| 2,790,736 | McLaughlin et al. | Apr. 30, 1957 |

UNITED STATES PATENT OFFICE
CERTIFICATE OF CORRECTION

Patent No. 3,026,241                      March 20, 1962

John F. Hechtman et al.

It is hereby certified that error appears in the above numbered patent requiring correction and that the said Letters Patent should read as corrected below.

Column 10, line 33, for "stack" read -- stock --; column 11, line 14, for "apparatus" read -- apparent --.

Signed and sealed this 24th day of July 1962.

(SEAL)
Attest:

ERNEST W. SWIDER
Attesting Officer

DAVID L. LADD
Commissioner of Patents